Jan. 6, 1970  J. K. TAGGART  3,488,015
FISHING REEL

Original Filed Sept. 20, 1963  3 Sheets-Sheet 1

INVENTOR
JOHN K. TAGGART
BY
Harness, Dickey & Pierce
ATTORNEYS

Jan. 6, 1970   J. K. TAGGART   3,488,015
FISHING REEL

Original Filed Sept. 20, 1963   3 Sheets-Sheet 2

INVENTOR.
JOHN K. TAGGART
BY
Harness, Dickey & Pierce
ATTORNEYS

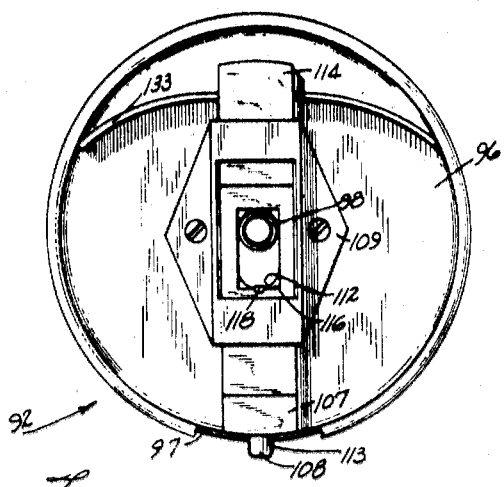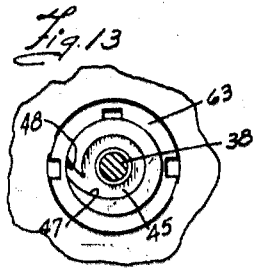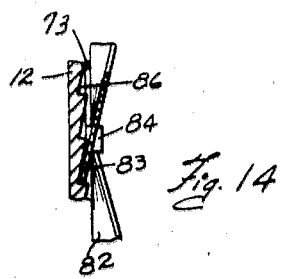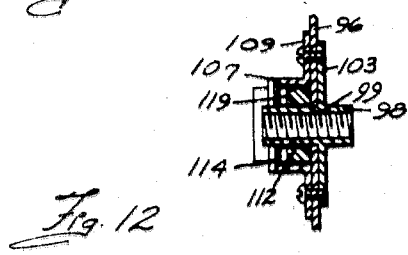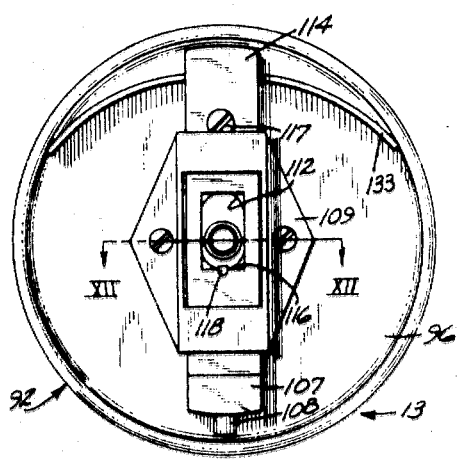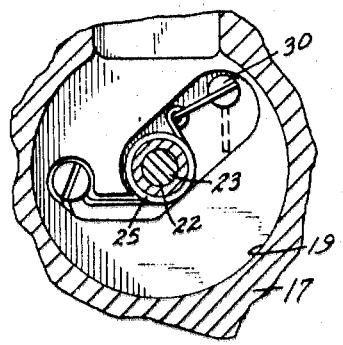

United States Patent Office 3,488,015
Patented Jan. 6, 1970

3,488,015
FISHING REEL
John K. Taggart, Indianapolis, Ind., assignor, by mesne assignments, to Victor Comptometer Corporation, Chicago, Ill., a corporation of Illinois
Original application Sept. 20, 1963, Ser. No. 310,201, now Patent No. 3,298,630, dated Jan. 17, 1967. Divided and this application Oct. 17, 1966, Ser. No. 587,087
Int. Cl. A01k 89/02
U.S. Cl. 242—84.51    1 Claim

ABSTRACT OF THE DISCLOSURE

This closed-faced spinning reel has a cup-shaped flier with a radially extending winding pin selectively retractable for casting by manually operated cam means on the front side of the flier accessible through a front center opening in the reel housing. A spool support carries the spool coaxial and rearward of the flier with the spool normally being held against rotation by friction plates at the opposite sides of the spool, each plate having a friction disk engaging the spool. An annular adjustment disk is threadedly connected to the spool support and is exposed by a radial opening in the reel housing for manual rotation which shifts the rear friction plate and disk relative to the spool to regulate the friction applied thereto. A spring interposed between the spool and rear friction plate has an arm extending into engagement with an annular arrangement of teeth on the rear of the spool to resist relative rotation between the rear friction plate and spool in the winding direction while giving an audible clicking signal upon rotation of the spool in the line unwinding direction.

---

This is a divisional application of the applicant's copending application for Fishing Reel, Ser. No. 310,201, filing date Sept. 20, 1963 now Patent No. 3,298,630.

This invention relates in general to a spin-type reel and, more particularly, to an improved structure for winding line upon the spool of a spinning reel and for releasing the line so that it can unwind freely from said spool.

Many attempts have been made to develop an uncomplicated spinning reel which provides for level-wind operation, which can be fabricated economically, and which is foolproof in operation. A reel of this general character is disclosed in my Patent No. 2,745,607. However, as a result of further experimentation with said reel, and preparing same for manufacture, I have devised improvements over my previous reel which it is the purpose of this application to protect. The reel herein illustrated and described is easier to operate, more compact in size, much easier to maintain and, in general, better suited for its intended purposes than similar reel constructions previously developed.

While the following descriptive material relates primarily to a spinning reel, it will be recognized that some of the disclosed features are also adaptable to use on, and capable of improving the operation of, spin casting reels. Thus, the term "spin-type" reel, as used herein, will have reference to a spinning reel and/or a spin-casting reel.

Accordingly, the objects of this invention include the provision of:

(1) A spinning reel which overcomes some of the shortcomings found in existing spinning reels for the same or similar purposes.

(2) A spinning reel, as aforesaid, which is small in size, light in weight, easy to operate and maintain, pleasing in appearance, and yet capable of long and satisfactory operation under normal conditions of use.

(3) A spinning reel, as aforesaid, having an improved spooling device or flier combined with a spool having level-wind capability.

(4) A spinning reel in which the spooling device includes a line guide which can be deactivated before making a cast by a simple, manual operation of an easily accessible part and reactivated after the cast merely by normal manipulation of the rewinding crank.

(5) An improved mechanism for activating and deactivating the line engaging member on the flier, which mechanism can be applied to spinning or spin casting reels, said mechanism including an escapement device which is foolproof in operation and capable of long, trouble-free use.

Other objects and purposes of this invention will become apparent to persons familiar with this type of equipment upon reading the following specification and examining the accompanying drawings, in which:

FIGURE 10 is an elevational view of the inside of the spooling device shown in FIGURE 6.

FIGURE 11 is an inside view of said spooling device in a different position of operation.

FIGURE 12 is a sectional view taken along the line XII—XII in FIGURE 11.

FIGURE 13 is a sectional view taken along the line XIII—XIII in FIGURE 4.

FIGURE 14 is a sectional view taken along the line XIV—XIV in FIGURE 8.

FIGURE 15 is a sectional view taken along the line XV—XV in FIGURE 5.

Figure 1:
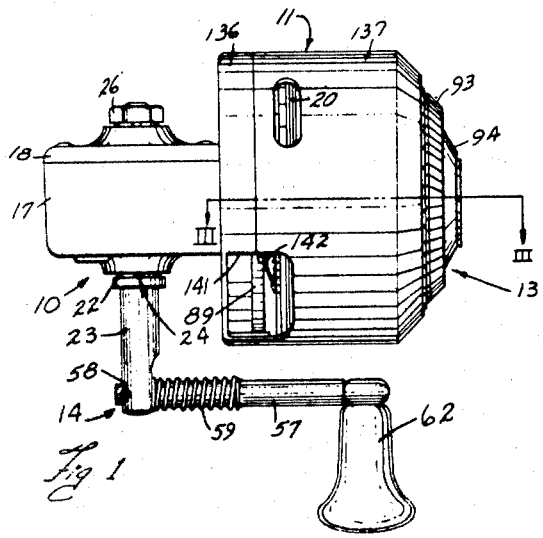
FIGURE 1 is a bottom view of a spinning reel, when it is in its normal operating position, embodying the invention.
Figure 2:
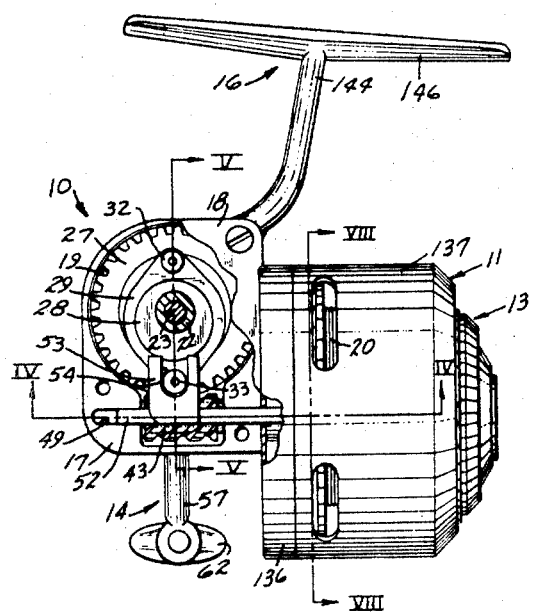
FIGURE 2 is a broken, side elevational view of said spinning reel.

For convenience in description, the words "upper," "lower" and words of similar import will have reference to the reel and parts thereof as appearing in FIGURE 2. The words "front," "rear" and words of similar import will have reference to the right and left sides, respectively, of the reel as appearing in FIGURES 1 and 2. The terms "inner," "outer" and derivatives thereof will have reference to the geometric center of said reel and parts associated therewith.

The objects and purposes of the invention, including those set forth above, have been met by providing a spinning reel having a gear housing which serves as a mounting structure upon which are supported the other parts of the spinning reel including a line receiving spool and a spooling device or flier for winding the line upon the spool. Mechanism is provided within the casing and the gear housing for effecting axial reciprocation of the spool and simultaneous rotation of the spooling device in response to rotation of a hand crank. A mounting bracket is secured to the gear box for connecting the spinning reel to a suitable fishing rod in a substantially conventional manner.

The spooling device includes a line-engaging member which is manually movable into an inoperative position so that line can be paid out from the spool with little or no resistance. The line-engaging member is releasably connected by an escapement device to the mounting structure of the reel so that the line-engaging member is automatically released into its operative position when the rewind crank of the spinning reel is turned in a direction which causes the line to be wound upon the spool.

The spinning reel of the invention, a preferred embodiment of which is disclosed in FIGURES 1 and 2, is comprised of a gear housing 10 upon which the spool 12 and spooling device or flier 13 are supported within a spool casing 11. A crank 14 and mounting bracket 16 are also supported upon the gear housing 10.

Figure 4:
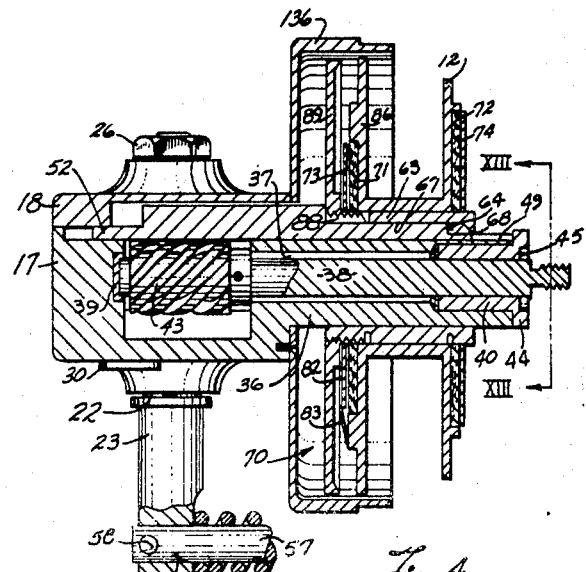
FIGURE 4 is a sectional view substantially as taken along the line IV—IV in FIGURE 2.

The gear housing 10 (FIGURES 2, 4 and 5) has a body structure 17 and cover plate 18 which define a gear chamber 19 through which a sleeve 22 extends. The shaft 23 of the crank 14 is removably receivable through the sleeve 22 wherein it is held by the key device 24 and the nut 26 for rotation with said sleeve 22. A gear 27 is mounted upon and rotatable with the sleeve 22 within the chamber 19. A spring clutch 25 (FIGURES 5 and 15) is mounted upon the sleeve 22 and connected to the body structure 17 to restrict, when engaged, said shaft to unidirectional rotation in a direction whereby the spooling device 12 winds the line upon the spool 12.

The gear 27 (FIGURES 2 and 5) has an eccentric 28 upon which the ring 29 is rotatably and concentrically mounted. A pair of bearings 32 and 33 are rotatably supported upon the ring 29 on diametrically opposite sides thereof so that they extend away from the gear 27. The cover plate 18 has a slot 34 into which the bearing 32 is received for movement radially of the sleeve 22 when the gear 27 is rotated by the crank 14.

Figure 3:
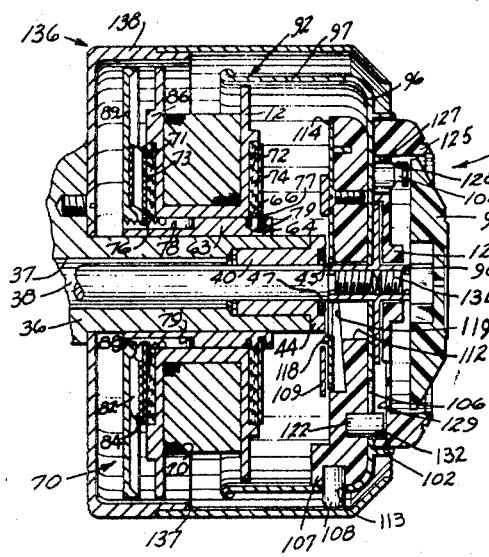
FIGURE 3 is a sectional view substantially as taken along the line III—III in FIGURE 1.

The body structure 17 (FIGURES 3 and 4) includes an integral, cylindrical spool support 36 having a coaxial, cylindrical opening 37 extending transaxially of the sleeve 22 into the chamber 19 below the gear 27. A drive shaft 38 extends, through, and is rotatably supported within, the spool support 36 near the opposite ends thereof by bearings 39 and 40. A worm gear 43 is mounted upon and rotatable with the drive shaft 38 within the gear chamber 19 so that it is continuously and drivingly engaged by the teeth of the gear 27. Accordingly, rotation of the crank shaft 23 effects rotation of the gear 27 whereby the worm 43, hence, the drive shaft 38, is rotated.

The front end of the shaft 38 (FIGURE 3) is threaded for connection to the spooling device 13, which is discussed hereinafter. The bearing 40 has at its front end a flange 44 with a concentric annular recess 45 in its axial face adjacent the shaft 38. As shown in FIGURE 13, the periphery of the recess 45 is defined by an annular ring 47 having a slot 48 therethrough which spirals with respect to the shaft 38, for reasons appearing hereinafter.

The cylindrical spool support 36 (FIGURE 4) has an axially disposed keyway 49 which extends from the front end thereof, adjacent the flange 44, through the wall of the body structure 17 and the cover plate 18 into the chamber 19. The inner edge of an elongated key-bar 52 is slidably disposed within the keyway 49 so that the rearward end of said bar 52 always extends into the gear chamber 19.

Figure 5:
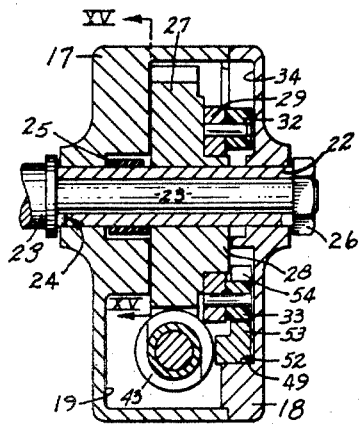
FIGURE 5 is a sectional view taken along the line V—V in FIGURE 2.

As shown in FIGURES 2 and 5, an upwardly opening yoke 53 is connected to the key-bar 52 within the chamber 19 so that the bearing 33 is received into the slot 54 defined by the yoke 53. Accordingly, rotation of the crank shaft 23 acts through the sleeve 22 and gear 27 to rotate the eccentric 28 whereby the bearing 33 is moved in a circular pattern with respect to the housing 10, and the yoke 53 and the key-bar 52 are caused to reciprocate. At the same time that the key-bar 52 is being reciprocated by the yoke 53, the worm gear 43 and the drive shaft 38 are being rotated by the gear 27.

In this particular embodiment, the crank shaft 23 (FIGURE 4) has near its outer end an opening 56 into which the crank arm 57 is slidably received. A key device 58 on the crank arm 57 and on the crank shaft 23 adjacent the opening 57 normally prevents rotation of the arm within the opening 57. A spiral spring 59, which encircles the crank arm 57 adjacent the crank shaft 23, releasably holds the key device 58 in engagment. A crank handle 62, which is rotatably supported upon the crank arm 57, can be pivoted with, and around the axis of, the crank arm 57 into and out of its operating position of FIGURE 1, after compressing the spring 59 until the key device 58 is released.

An adjustment sleeve 63 (FIGURE 3 and 4) is slidably supported upon the cylindrical spool support 36 and is connected to the key-bar 52 by the snap ring 64. The spool 12 is rotatably supported upon the adjustment sleeve 63 between the axial ends thereof. Said sleeve 63 has an annular groove 66 into which the snap ring 64 is received, and said sleeve 63 has a keyway 67 in its inner surface into which the outer edge of the key-bar 52 is slidably received. The snap ring 64 extends through the groove 66 into the keyway 67 where it can be received into a notch 68 in the key-bar 52 for preventing relative axial movement therebetween.

The spool 12 has a drag or brake mechanism 70 (FIGURES 3 and 4) which includes the annular friction disks 71 and 72 secured to the opposite axial ends of the spool. A pair of annular friction plates 73 and 74 are supported upon, and are held against rotation with respect to, the adjustment sleeve 63 at opposite axial ends of the spool 12 for frictional engagement with said disks 71 and 72, respectively. The friction plates 73 and 74 have inwardly extending fingers 76 and 77, respectively (FIGURE 3), which are received into grooves 78 and 79, respectively, in the adjustment sleeve 63 for preventing said relative rotation between the friction plates 73 and 74 and the sleeve 63. However, the rearward groove 78 is sufficiently elongated to permit substantial axial movement of friction plate 73 with respect to the adjustment sleeve 63 for the purpose of adjusting the drag.

Figure 8:
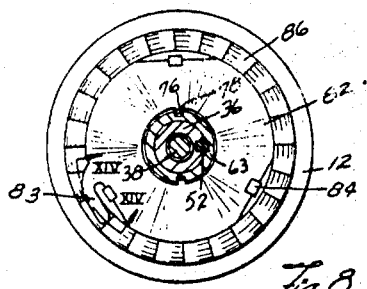
FIGURE 8 is a sectional view substantially as taken along the line VIII—VIII in FIGURE 2.

An annular spring plate 82, which has a pawl or click finger 83 extending from its outer edge, is mounted upon the friction plate 73 by means of the tabs 84, which are integral with the outer edge of the friction plate 73. The spool 12 has a plurality of integral ratchet teeth 86 projecting from and arranged in a circle on the rear side of the spool adjacent the friction plate 73. Said teeth 86 are located radially outwardly of the periphery of plate 73 for engagement by the click finger 83. The teeth 86 and finger 83 are arranged to effect a clicking sound when the spool 12 is rotated in an unwinding direction, which is a counterclockwise rotation as appearing in FIGURE 8. Said finger is also arranged to engage the teeth 86 and thereby oppose relative rotation between the spool 12 and the spring plate 82 in the winding or clockwise direction of FIGURE 8. As shown in FIGURE 14, the spring plate 82 has a wave-like form in a circumferential direction, so that it can be used to effect a resilient pressure between the friction disks 71, 72 and the friction plates 73, 74.

The rearward end of the adjustment sleeve 63 has threads 88 for threaded engagement by, and support of, an annular adjustment disk 89, which is moved axially of the sleeve 63 in response to relative rotation therebetween. Thus, the pressure between the friction plates 73, 74 and the friction disks 71, 72 can be varied by rotating the adjustment disk 89, whereby to vary the ease with which the spool 12 can rotate with respect to the adjustment sleeve 63 in an unwinding direction.

Figure 6:
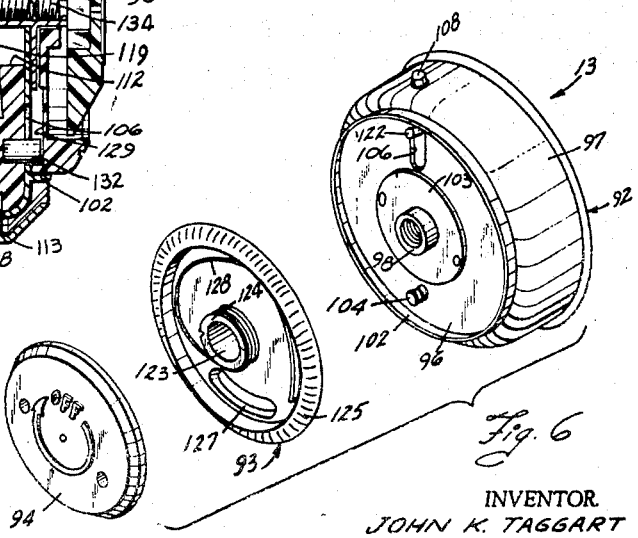
FIGURE 6 is an exploded perspective view of the spooling device of the reel.

The spooling device of flier 13 (FIGURES 3 and 6) is comprised of a cup-shaped line guide 92, an annular cocking member 93, which is rotatably supported upon the front side of the line guide 92, and a nose cap 94 which is removably mounted upon the line guide 92 for the purpose of holding the cocking member 93 in position.

The line guide 92 (FIGURES 3, 6 and 10) has an axial end wall 96 and a substantially cylindrical peripheral wall 97 integral with said end wall 96. A flanged and internally threaded tube 98 (FIGURES 3 and 12) extends through the central opening 99 in the end wall 96, and the flange 103 is secured to said end wall. The threaded end of the drive shaft 38, which preferably has a left-hand thread, is threadedly received into corresponding threads in the rearward end of the tube 98 whereby the line guide 92, hence the spooling device 13, is secured to and rotated with the shaft 38.

Figure 9:
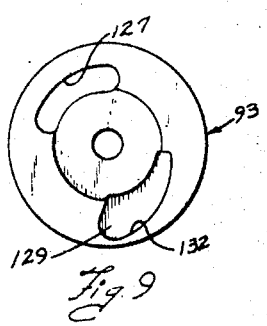
FIGURE 9 is an inside view of the cocking member of said spooling device shown in FIGURE 6.

The line guide 92 (FIGURES 6, 7 and 9) has an annular flange 102 on, and concentric with, the front side of the end wall 96. Said flange 102 is spaced outwardly from the flanged tube 98, and the cocking member 93 is disposed snugly therewithin. A pivot pin 104 is rigidly secured to the end wall 96 and extends frontwardly therefrom between the flanges 102 and 103. A slot 106, which is elongated radially of the guide 92, is provided in the end wall 96 between the flanges 102 and 103 on the diametrically opposite side of the end wall 96 from the pivot pin 104.

A shiftable member 107 (FIGURES 3, 11 and 12), which includes the line-engaging element 108, is slidably supported upon the rearward surface of the end wall 96 by the bracket 109 so that said member 107 can move diametrically of the line guide 92 whereby the engaging element 108 is moved between its FIGURE 10 and FIGURE 11 positions. The shiftable member 107 has a slot 112, which is elongated diametrically of said line guide 92 and through which the rearward end of the tube 98 is slidably received. The mounting bracket 109 has an opening through which said tube 98 also extends.

In this particular embodiment, the shiftable member 107 is fabricated from a material, such as nylon, having a self-lubricating characteristic. The line-engaging element 108 is a metal pin which is embedded in and extends from one end of the shiftable member 107 so that said pin can project through an opening 113 in the peripheral wall 97 of the support member 92 when said shiftable member 107 is in its line-engaging position.

A resiliently flexible metal plate 114 (FIGURES 3 and 11) is mounted upon the rearward surface of the shiftable member 107 and has an elongated opening 116 through which the rearward end of the tube 98 extends. The plate 114, which is secured to the member 107 by a screw 117, has an integral finger 118 which projects rearwardly from the plate 114 adjacent the opening 116 therein and remote from the screw 117. The finger 118 is arranged so that movement of the shiftable member 107 from its FIGURE 10 position to its FIGURE 11 position will cause said finger 118 to move past the rim 47 on the annular flange 44 into the annular recess 45, wherein said finger 118 is held by said rim 47. The rearward side of the member 107 is recessed at 119 to permit flexing of the plate 114 frontwardly as the finger 118 snaps over the rim 47. Said member 107 also has an actuating post 122 which extends frontwardly through the slot 106 in the end wall 96. The finger 118 and rim 47 cooperate to provide an escapement mechanism whereby the shiftable member 107, hence the line-engaging element 108, is releasably held in an inoperative position in which it cannot engage the line 20.

The cocking member 93 (FIGURES 6, 7 and 9) has a coaxial opening 123 through which the front end of the tube 98 is slidably received. Said cocking member 93 has an inner annular flange 124 projecting frontwardly therefrom and snugly but rotatably embracing the tube 98. Said member 93 has an outer annular flange 125 which is knurled on its front face for easy manual gripping. Said cocking member has an arcuate slot 127 adjacent the outer flange 125 through which the pivot pin 104 is slidably received. A spiral spring 128 is connected at one end to the front end of the pivot pin 104 and at its other end to the inner flange 124, which it encircles. The spiral spring 128 is arranged and connected so that it tends to urge rotation of the cocking member 93 is a clockwise direction with respect to the line guide 92, as appearing in FIGURE 7.

Figure 7:
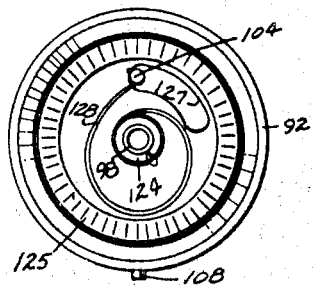
FIGURE 7 is a front view of the spooling device of FIGURE 6 with the nose plate removed therefrom.

The rear surface (FIGURE 9) of the cocking member 93 has an arcuate recess 129, the radially outer edge of which defines a spiral around the opening 23 and serves as a cam 132. The recess 129 is on the diametrically opposite side of the opening 123 from the slot 127. The actuating post 122 is received into the recess 129 when the front end of the tube 98 is snugly within the opening 123 and the pivot pin 104 is extending through the slot 127. The cam 132 formed by the radially outer edge of the arcuatae recess 129 is shaped so that rotation of the cocking member 93 in a counterclockwise direction, as seen in FIGURE 7, causes said cam edge 132 to engage and move the actuating post 122 inwardly whereby the shiftable member 107 is moved from its FIGURE 10 position into its FIGURE 11 position. As soon as the manual engagement of the cocking member 93 is released, the spring 128 returns the disk to its FIGURE 7 position.

The leaf spring 133 (FIGURE 11) which is secured to the shiftable member 107 near the end thereof remote from said element 108, resiliently opposes movement of the member 107 from its FIGURE 10 position into its FIGURE 11 position. Accordingly, the spring 133 urges the finger 118 against the rim 47, whereby rotation of the spooling device 13 will permit the leaf spring 133 to urge said finger 118 out through the spiral slot 48, so that the shiftable member 107 can return to its normal (FIGURE 10) position, wherein it is capable of winding the line 20 onto the spool 12.

The nose cap 94 (FIGURE 3) has a post 134 with a left-hand thread which is threadedly receivable into the front end of the tube 98, whereby the cocking member 93 is held in its operating position upon the inner flange 124 and within the outer flange 125.

The spool casing 11 (FIGURES 1, 2 and 3) is comprised of a cup-shaped, rear member 136 which concentrically encircles the cylindrical spool support 36 and the adjustment disk 89. The casing 11 also includes a substantially cylindrical front member 137 which is coaxial with and extends frontwardly from the peripheral wall 138 of the rear member 136. The front member 137 is removably supported upon the rear member 136, and said rear and front members have openings 141 and 142, respectively, in adjacent edges thereof. The openings 141 and 142 are aligned so that the outer, knurled edge of the adjustment disk 89 can be manually engaged through said openings to adjust the drag mechanism 70, hence the tension on the fishing line 20.

The mounting bracket 16 (FIGURE 2) has an arm 144 which is rigidly secured to and extends substantially upwardly from the body structure 17, and which is rigidly connected at its upper end to a mounting plate 146, which can be mounted upon a conventional fly rod or the like in a substantially conventional manner.

At the beginning of a normal operation of a reel embodying the invention, the parts of the crank 14 are in their FIGURE 1 positions, with respect to each other, and the line 20 is substantially completely wound upon the spool 12. The free end portion of said line 20 is threaded frontwardly through the reel between the peripheral wall 97 of the line guide 92 and the inner surface of the cylindrical member 137 of the casing 11 so that said line can be engaged by the line-engaging element 108 when the shiftable member 107 is extended, namely, in its FIGURE 10 position.

If removal of the line from the spool 12 is desired, the cocking member 93 is manually engaged and rotated in a counterclockwise (FIGURE 7) direction whereby the shiftable member 107 is retracted into its FIGURE 11 position and the finger 118 is retracted into the recess 45. The finger 118 engages the inner surface of the rim 47 and thereby holds the member 107 retracted, whereby the line-engaging element 108 is moved inside of the support member 92 so that it cannot interfere with the free unwinding of the line 20 from the spool 12.

When the desired amount of line 20 has been removed from the spool 12, the crank 14 is manually engaged and rotated in a winding direction. The finger 118, which is rotated with the support member 92, moves out through the spiral slot 48 in the axial face of the rim 47, under the urging of the leaf spring 133, during some part of the first 360 degrees of rotation of the spooling device 13 with respect to the spool 12. Thus, the shiftable member 107 is released into its extended (FIGURE 10) position where the line-engaging element 108 (FIGURE 3) is sufficiently close to the inner side of the casing 11 that said element will engage the line 20 and wind it upon the spool 12 during subsequent rotations of the crank 14. Due to the axial reciprocation of the spool 12 with respect to the cylindrical spool support, the line will be wound uniformly and automatically upon the spool 12 as the spooling device 13 is rotated. If, while the crank 14 is being turned in a winding direction, the line 20 is held or yieldably restrained against movement toward the spool 12, the friction disks and plates 71, 72, 73 and 74, and the click finger 83, which engage the spool 12, will slip and will thereby permit the spool 12 to rotate with the spooling device 13 so that no additional line is wound upon the spool, until the line 20 is again released. It follows, therefore, that the line 20 can be pulled away from the spool 12, while the shiftable member 107 and its line-engaging element 108 are extended (FIGURE 10 positions) if sufficient outgoing force is applied to the line to overcome the resistance to rotation of the spool 12 created by the drag mechanism 70.

In this particular embodiment, rotation of the crank 14 in an unwinding direction is opposed by the clutch 25 because such rotation could tangle the line within the reel and because, under normal circumstances, such rotation is not necessary to the satisfactory operation of the reel. However, by moving the adjustment crank 30 (FIGURE 15) from its solid line position to its broken line position, the clutch 25 is expanded to permit rotation of the crank 14 in both rotational directions. Rotation of the spool 12 in a winding direction with respect to the spool support 36 is positively obstructed by engagement between the click finger 83 and the ratchet teeth 86.

When the user is ready again to cast or otherwise remove the line 20 from the spool 12, the cocking member 93 is again manually engaged and rotated in a counterclockwise direction (FIGURE 7) so that the shiftable member 107 is again retracted to its FIGURE 11 position where it will be held until the crank 14 is again turned in the winding direction.

Although a particular preferred embodiment of the invention has been disclosed hereinabove for illustrative purposes, it will be understood that variations or modifications of such structure, which come within the scope of the appended claim, are fully contemplated.

What is claimed is:
1. A spin-type reel for a fishing line, comprising,
   a mounting structure including a substantially cylindrical spool support,
   shaft means supported by and extending through said spool support,
   a spool mounted on said spool support,
   a pair of friction discs mounted on the opposite ends of said spool,
   a pair of friction plates mounted on the opposite ends of said spool support adjacent said friction discs,
   means supporting one of said plates for axial movement relative to said spool,
   an adjustment disc mounted on said spool support,
   said adjustment disc being axially movable relative to said spool and engageable with said one friction plate for moving the same axially of said spool and thereby varying the frictional resistance between said friction plates and said friction discs,
   spring means resiliently urging one of said friction plates axially of said spool support, and
   inter-engageable means on said spring means and said spool for resisting rotational movement therebetween.

References Cited

UNITED STATES PATENTS

| | | |
|---|---|---|
| 2,521,543 | 9/1950 | Shakespeare et al. |
| 2,558,896 | 7/1951 | Young et al. |
| 2,745,607 | 5/1956 | Taggart et al. |
| 3,029,040 | 4/1962 | Wood. |
| 3,061,230 | 10/1962 | Gayle. |
| 3,105,650 | 10/1963 | Kuether _____ 242—84.2 |
| 3,120,357 | 2/1964 | Wood _____ 242—84.5 |

BILLY S. TAYLOR, Primary Examiner